United States Patent [19]

Ellis

[11] 4,008,395
[45] Feb. 15, 1977

[54] FLEXIBLE TUBE SECTION FOR GIMBALLED IR DETECTORS

[75] Inventor: Herbert B. Ellis, Pasadena, Calif.

[73] Assignee: The United States of America as represented by the Secretary of the Navy, Washington, D.C.

[22] Filed: Aug. 2, 1974

[21] Appl. No.: 494,101

[52] U.S. Cl. .............................. 250/352; 250/342
[51] Int. Cl.² .......................................... G01J 1/00
[58] Field of Search .......... 250/334, 342, 347, 352, 250/338

[56] References Cited

UNITED STATES PATENTS 3,076,095  1/1963  Becklund et al. ................. 250/342

Primary Examiner—Harold A. Dixon
Attorney, Agent, or Firm—Richard S. Sciascia; Joseph M. St.Amand; David O'Reilly

[57] ABSTRACT

A flexible tube section for supplying coolant to infrared (IR) detectors mounted in a gimballed system. The tube section is comprised of a plurality of coils and lever arms for supplying coolant to an IR detector mounted on a gimbal telescope and which flexes with the gimballed telescope. The tube section has a fixed attachment loop and a rotating attachment loop connected by three coils providing clearance for the envelope of the gimbal structure and flexing with gimbal rotation. Two of these flexible tube sections are required for supplying coolant across the two gimbal axes.

4 Claims, 3 Drawing Figures

FLEXIBLE TUBE SECTION FOR GIMBALLED IR DETECTORS

BACKGROUND OF THE INVENTION

This invention relates to systems for providing cooling to IR detectors and more particularly relates to systems providing cooling to IR detectors mounted on a gimballed system. In infrared missile seeker design configuration, the rigid mounting of the IR detectors on the gimballed telescope is an important design advantage. To accomplish this, means must be provided for cooling the gimballed IR detectors. In order to cool the detectors, high pressure gas (1200 psi) must be supplied from a tank mounted in the missile body to the cryostat in the detector/dewar assembly. This requires bringing the high pressure gas across the two axes of the gimbal. A key requirement of this type of a connection is that a relatively low and consistent torque as a function of the gimbal angle be maintained.

Due to the low torque requirements and the high pressures, no swivel joints or other movable type connections could be found which would satisfactorily carry the gas flow across the gimbal axis. As a result, the capillary flexible tube section disclosed was conceived as the best means of conducting the cooling gas to the IR detectors. The flexible tube section disclosed provides accurate pointing and stabilization of the gimballed telescope and maintains minimum frictional and unbalanced torsional forces across the gimbal axis, as required.

SUMMARY OF THE INVENTION

To solve the problem of supplying high pressure coolant to gimballed IR detectors while maintaining low torque, the flexible tube section conceived is configured to fit around the torque motors and be harmonious with the gimbal envelope. There are two of these sections connected in series to cross the two gimbal axes. Each gas coolant supply line has a first loop loosely mounted on a fixed post, three flexible coils passing around the gimbal envelope, terminating in another loop mounted on a rotating post. The latter loop of the first tube section for crossing the inner gimbal axis is connected to the cryostat on the gimballed telescope. The cryostat is fixed mounted on the optical axis of the gimballed telescope and connected to the flexible tube section by a standard capillary tube connector. The three flexible coils providing clearance around the gimbal envelope are constructed to flex when the telescope is moving from side to side. There are two short coils perpendicular to each axis of rotation and one long flexure coil connecting these two. Motion of the gimballed telescope causes the support loops to rotate on their axes while the three envelope clearance connecting flexures bend parallel to their axes, as will be more clearly described hereinafter. The second flexible tube section for crossing the outer gimbal axis is connected to the coolant supply tank at one end and to the first tube section at the other end by a standard tube connector.

OBJECTS OF THE INVENTION

It is one object of the present invention to provide apparatus for supplying coolant to gimbal mounted IR detectors.

Another object of the present invention is to provide a coolant supply apparatus to gimbal mounted IR detectors which provides a minimum of torque on the gimballed telescope.

Another object of the present invention is to provide a coolant supply apparatus which eliminates the need for rotating connections.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
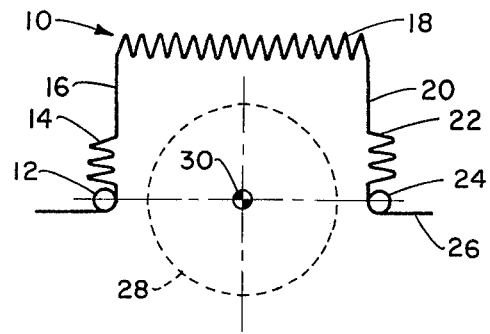
FIG. 1 is a diagram of the flexible coolant supply connecting system in somewhat schematic form.

Referring now to FIG. 1, there is shown a schematic of a flexible tube section for supplying coolant to IR detectors mounted on a gimbal telescope. The flexible tube section 10 is comprised of a length of capillary tubing configured to provide a fixed attachment loop coil 12, a lever arm flexure coil 14, a lever arm 16, a connecting flexure coil 18, a second lever arm 20, a second lever arm flexure coil 22, and a rotating attachment loop coil 24 which is connected by line 26 to a cryostat mounted on the axis of the gimballed telescope. The flexible tube section 10 is mounted and positioned to clear the interference envelope indicated by dash circle 28 of the gimbal structure about the axis of angular movement indicated at 30. Fixed attachment loop coil 12 is connected to a coolant supply tank (not shown) mounted in the missle body while rotating attachment loop coil 24 is connected by a standard capillary tube connector to a Joule-Thomson cryostat fixed mounted on the optical axis of the gimballed telescope.

Figure 2:
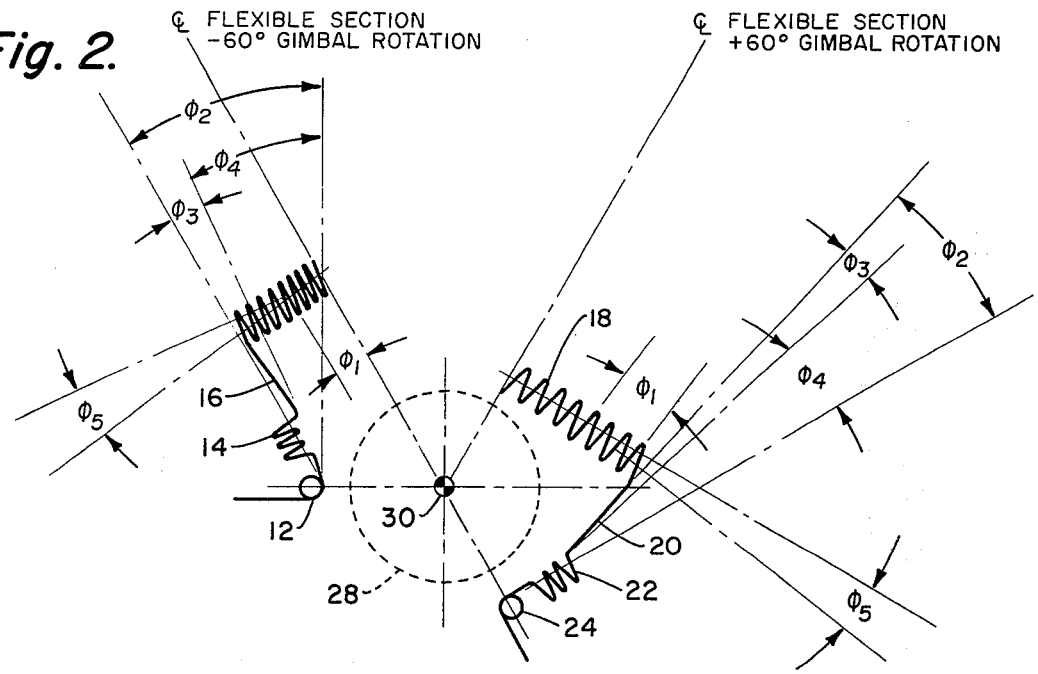
FIG. 2 is a diagram of the flexible coolant supply connecting system in schematic form showing how the system flexes.

The basic mechanics of the torque/deflection characteristics of the invention to achieve the low torque/angular deflection spring constant required by the gimbal servo systems is shown in FIG. 2. The spring constant is uniform and repeatable (as required by the gimbal servo system) as only elastic deflection forces of the tubing are involved. In this type of device, the deflection torque to the gimbals is applied by a lever arm (such as lever arm 20) and is the product of the force (F) applied to the end of the lever arm and the effective length of the distance normal to the force vector between the force vector and the gimbal axis of rotation. That is, torque (T) is equal to the force (F) times the length of the lever arm (1). The magnitude of this force is a function of the deflection of the lever arm and its spring constant.

The deflections encountered by the flexible tube section under gimbal angular displacements of $-60°$ gimbal rotation and $+60°$ gimbal rotation are illustrated. For $+60°$ gimbal rotation, the end of lever arm 20 deflects an amount $\phi_2$, and the force required to cause this deflection is the result of the combined deflection of the cantilevered tube lever arm 20, and the deflection of the second lever arm flexure coil 22. As can be seen by the angle $\phi_4$, the lever arm flexure coil 22 has a predominant effect, and is therefore designed with enough sufficiency of large coils of the tubing to give the required low spring constant for the development of the low torque/deflection characteristics required. The deflection spring constant of the tubular lever arm 20 itself is a function of the tube stiffness, the length of the arm, and the degree of the interaction between it and the connecting flexure 18, as it approaches a classical "pinned joint" which results in the greatest deflection of the lever arm for a given applied force (F). To achieve an effective pinned joint, the design of the connecting flexure 18 is important so as to be flexible to adapt to the relative angular deflections on the lever arm 20 and throughout the gimbal angular motion, as well as providing a low axial deflection (elongation or compression) spring constant. The composite effect of the axial spring deflection ($\phi_1$) and the bending ($\phi_5$) of the connecting flexure 18 to adapt to the lever arm position can be summed into one force vector (F).

The dimensions of the coils in the connecting loops 12, 24, lever arm flexures 14, 22, and the connecting flexure 18, and the straight sections of lever arms 16, 20 of the flexible tube section have significant effects on the angular spring constant and maximum gimbal axis angular motion. Standard theoretical spring formulas are used to establish the dimensions of the coils (coil diameter, number of turns, length of straight sections, etc.). These dimensions are determined after the particular configuration for delivering coolant across the gimbal axis is determined. Thus, to meet space requirements, connecting flexure 18 must be far enough out to clear the envelope 28 of the gimbal telescope.

For a minimum spring constant, the connecting flexure should be made as long as possible; that is, it should be at least as long as the diameter of the envelope 28. Joining connecting flexure 18 to vertical loops 12 and 24 with straight sections was found to produce too high a torque; therefore, lever arm flexures 14 and 22 are provided. Vertical tube coil loops 12 and 24 not only provide further reduction in the spring constant, but also provide a convenient anchorage for the entire flexible tube section. As can readily be seen, the minimum length of each lever arm and lever arm flexure coil 14, 16, and 20, 22 is that which will provide sufficient clearance for the gimbal envelope 28. That is, this length must be at least one-half the diameter of the gimbal envelope 28. For a specific application, the design must be tailored to fit within the geometrical restriction of the installation, as well as meet the gimbal axis angle of motion.

The previous discussion has outlined how the proper dimensions and configurations would be determined to reduce the invention to practice. The tube material itself is selected on the basis of physical and mechanical properties of the potential candidate materials. The tubing should be of as small a diameter and wall thickness as possible compatible with the gas pressure (1200 psi to 5000 psi) and flow requirements, as well as the stress/fatigue characteristics of the selected tube materials. The coolants most commonly used are air and nitrogen and, in some cases, argon and helium are used. Examination of fatigue curves and corrosion resistance of the materials selected are also factors to be considered.

Figure 3:
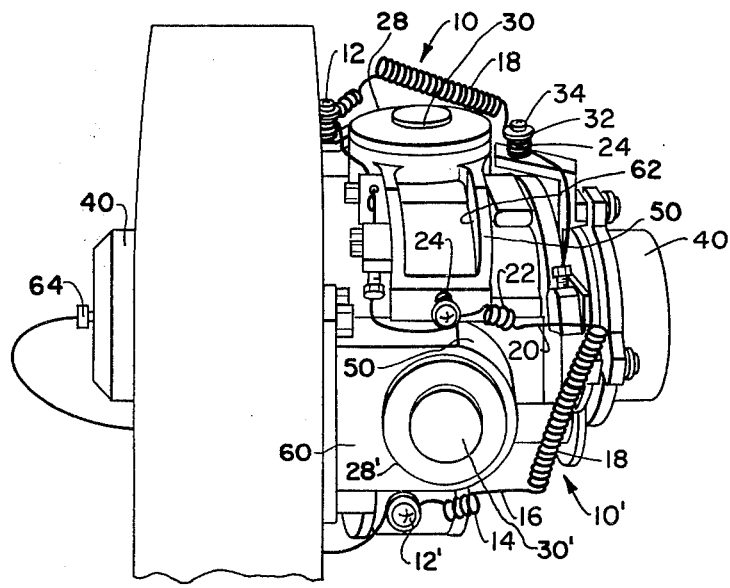
FIG. 3 illustrates the flexible tube section mounted on the gimballed telescope.

A specific configuration of the flexible tube sections for delivering coolant to the cryostat and IR detectors on an IBIS 1.5 seeker are shown in FIG. 3. As shown in FIG. 3, telescope 40 containing the infrared detector (not shown) is attached to gimbal mechanism 50. Gimbal mechanism 50 provides motion to telescope 40 about gimbal axes 30 and 30'. Gimbal axis 30 is an inner gimbal axis while gimbal axis 30' is an outer gimbal axis. Tube section 10' is connected between fixed vertical loop coil 12' and rotating vertical loop coil 24'. Fixed vertical loop coil 12' is connected to gimbal member 60 while rotating vertical loop coil 24' is connected to gimbal member 62. Tube section 10 is connected between fixed vertical loop coil 12 and rotating vertical loop coil 24. Fixed vertical loop coil 12 is connected to gimbal member 62 while rotating vertical loop coil 24 is connected to telescope 40. Coolant traverses tube section 10 and 10' from the supply tank (not shown) to coil 12', through tube section 10' to coil 12, through tube section 10 to inlet 64. The flexible tube section 10 is anchored to the gimballed telescope 40 by a fixed bushing 32 inserted in vertical loop coils 12 and 24 and held in place by screw 34. The diameter of the bushings 32 are less than the inside diameter of the coils 12, 24 to provide a loose fit with the coil permitting a free sliding angular motion of the tube coil relative to the bushing. In this application, the vertical loop coils 12, 24 were approximately four turns of 0.046 bore 304 stainless steel, which exceeded the fatigue and wall thickness requirements and also provided the necessary corrosion resistance. In some cases, brass tubing may be suitable but generally its fatigue requirements are inadequate. The lever arm connecting flexures 14 and 22 are four to five turns. The connecting flexure 18 is approximately 30 turns.

In the application to the IBIS 1.5 seeker, the attachments by the two bushings through the vertical coils 12 and 24 gave adequate support to the entire tube section cantilevered from these mounted bushings. There may be applications where the cantilevered overhang of the flexible tube section 18 is such that under vibratory environments, excessive deflection of the section may be encountered, requiring additional support of the long coil tubing section. Such support would prevent fatigue failures in the tubing and keep the tube coil from contacting the seeker and gimbal structure. The cryostat is fixed mounted on the optical axis of the gimbal telescope and is connected to a length of capillary tubing extending from the attachment to the inner gimbal to which the telescope rigidly attaches. This connection is made by a standard capillary tube connector. A second flexible tube section, indicated similar to the first, provides gas flow across the outer at 10', gimbal axis from a supply tank to the first flexible tube section 10, providing gas flow around the inner gimbal axis.

Thus there has been disclosed an apparatus for carrying high pressure coolant gas to gimbal mounted IR detectors. The apparatus disclosed maintains frictional and unbalanced torsional forces across the gimbal axis at an absolute minimum while achieving an accurate pointing and stabilization of the gimballed telescope.

Obviously, many modifications and variations of the present invention are possible in light of the above teachings. It is therefore to be understood that within the scope of the appended claims the invention may be practiced otherwise than as specifically described.

I claim:
1. An infrared missile seeker assembly comprising:
   a. a telescope mounted on a gimbal having inner and outer gimbal axes;

b. an infrared detector rigidly mounted on said telescope; and c. means for supply coolant to said detector comprising two flexible tube sections each having a plurality of individual coils configured to circumvent said inner and outer gimbal axes, each said individual coil having a low spring constant, thus minimizing any resultant torque on said gimbal.

2. The infrared missle seeker according to claim 1 wherein each flexible tube section is comprised of:

a. a first vertical coil supported on a fixed attachment;

b. a second vertical coil supported on a rotating attachment;

c. first and second lever arm flexure coils extending outward perpendicular to the gimbal axes; and d. a long connecting flexure coil joining the first and second lever arm flexure coils.

3. The infrared seeker according to claim 2 wherein the attachments for the first and second vertical coils comprise a bushing through the coil, said bushing having a diameter slightly less than the diameter of the coil.

4. The infrared seeker according to claim 3 wherein said capillary tubing is comprised of 0.046 bore stainless steel.

* * * * *